Aug. 9, 1927.

G. R. CATOLDO 1,638,618

VEGETABLE AND FRUIT CRUSHER

Filed June 2, 1925     2 Sheets-Sheet 1

Inventor
Giovanni R. Catoldo,
by Roberts Roberts Cushman
Attys.

Aug. 9, 1927.

G. R. CATOLDO 1,638,618

VEGETABLE AND FRUIT CRUSHER

Filed June 2, 1925

Inventor
Giovanni R. Catoldo,
by Roberts, Roberts & Cushman
Attys.

Patented Aug. 9, 1927.

1,638,618

UNITED STATES PATENT OFFICE.

GIOVANNI R. CATOLDO, OF BOSTON, MASSACHUSETTS.

VEGETABLE AND FRUIT CRUSHER.

Application filed June 2, 1925. Serial No. 34,362.

This invention pertains to fruit and vegetable crushers and has for its principal object the provision of an apparatus of portable type which may be manufactured at relatively low cost, which is readily applicable to or removable from a receptacle, for example a barrel, into which the crushed fruit or other material is delivered, and comprising means adapted to exert a true crushing action upon the material as distinguished from a mere cutting or tearing, together with means operative to feed the material to the crushing element and preferably capable of subjecting the material to a preliminary cutting action.

In the accompanying drawings a preferred embodiment of the invention is illustrated by way of example.

Figure 1:
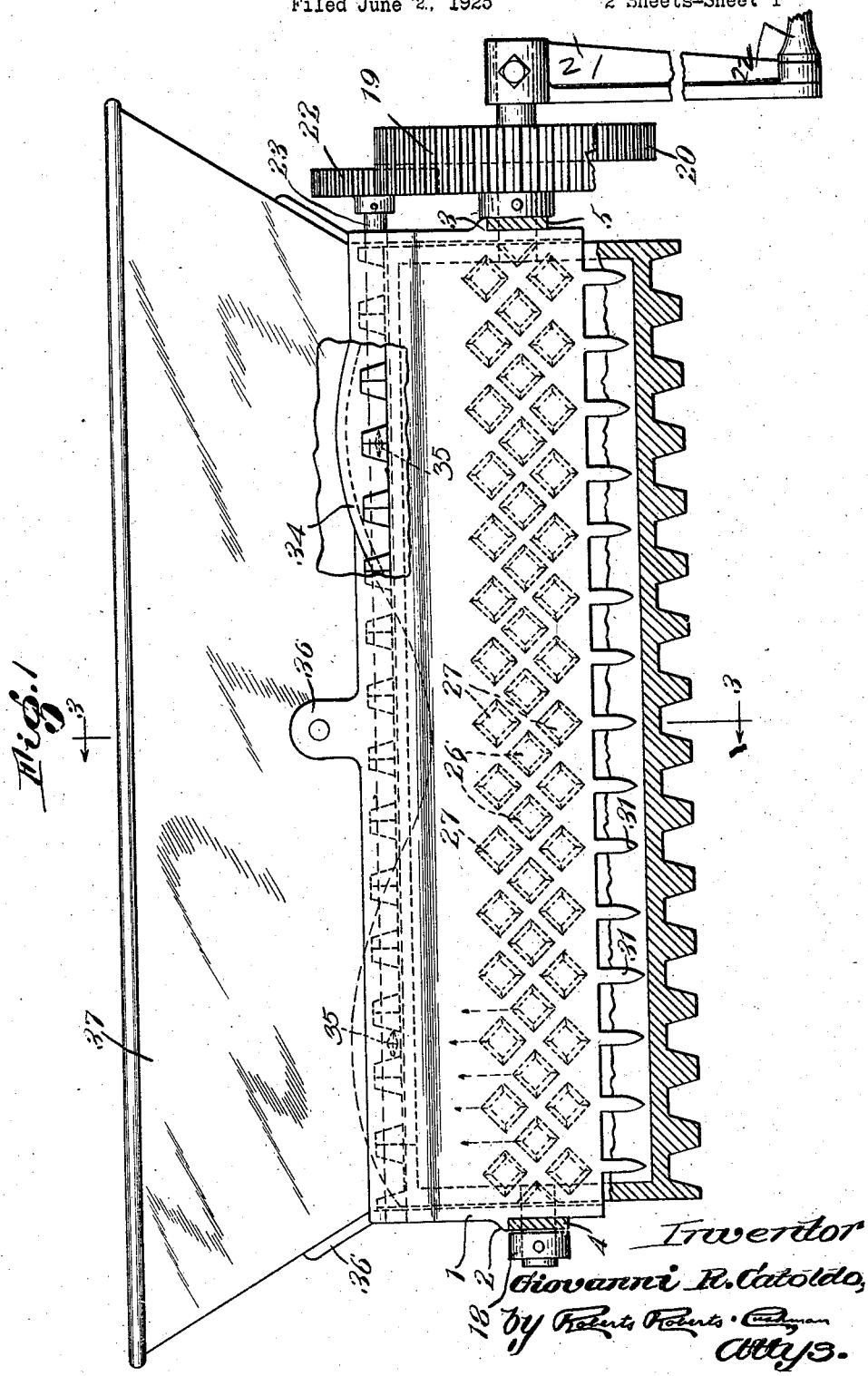
Fig. 1 is a side elevation of the improved apparatus, certain parts being broken away and certain parts being in section substantially on the line 1—1 of Fig. 3.
Figure 2:
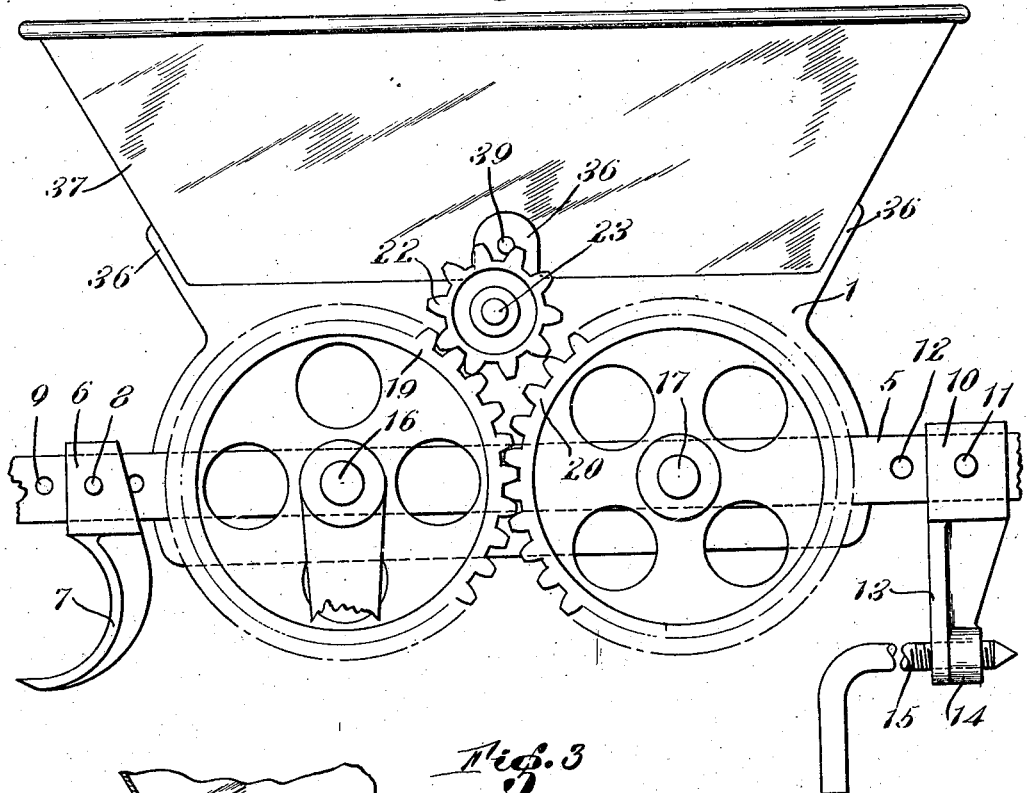
Fig. 2 is an end elevation of the apparatus viewed from the right hand side of Fig. 1, certain parts being broken away.

Referring to the drawings the numeral 1 designates a substantially rectangular frame open at top and bottom and preferably made of cast iron although other suitable material may be employed if desired. This frame is somewhat longer than wide and its ends are furnished with projecting shoulders 2 and 3 respectively which bear against the upper edges of transversely extending horizontal supporting bars 4 and 5.

These supporting bars may be made of steel or other suitable material and each bar is furnished at one end with a sliding bracket 6 having a curved claw 7. These brackets 6 may be held in adjusted position upon their respective bars by means of removable pins or bolts 8 adapted to engage any selected one of a series of spaced openings 9 in the corresponding bar.

At their opposite ends the bars 4 and 5 are provided with sliding brackets 10 adapted to be held in adjusted position by means of pins or bolts 11 entering openings 12 in the bars. These brackets 10 are furnished with downwardly projecting arms 13 having internally screw threaded bosses 14 at their lower ends. A clamp screw 15 engages the screw threaded opening of each boss 14 and by means of the claws 7 and the clamping screws 15 the apparatus may be firmly clamped to the top of a suitable receptacle such for example as a barrel, the end portions of the bars 4 and 5 resting across the upper edge of such receptacle.

The end walls of the frame 1 are provided with bearing openings for the reception of parallel shafts 16 and 17 the ends of which extend through suitable openings in the bars 4 and 5. At the rear end of the apparatus the projecting ends of the shafts are furnished with retaining collars 18 while at their forward ends they are provided with spur gears 19 and 20 respectively which mesh with one another. The shaft 16 is extended forwardly beyond the gear 19 and is furnished with a crank arm 21 having a handle 22 by means of which the shaft 16 may be rotated, thus turning the shaft 17 in the opposite direction.

The gear 19 has a wider face than the gear 20 and also meshes with a pinion 22 secured to a shaft 23 journalled in a bearing opened in the forward end wall of the frame 1.

The shafts 16 and 17 are provided respectively with crushing rolls 24 and 25 which may be of any suitable construction and preferably hollow to save weight. The exterior surfaces of the crushing rolls are furnished with axially spaced circumferentially extending series of crushing teeth 26 and 27 respectively. The teeth of each series are suitably spaced apart circumferentially and each tooth is preferably of truncated pyramidal form, the outer ends of the teeth being substantially flat and of substantial area. The series of teeth upon the respective rollers are staggered in relation to each other so that the teeth of one roller intermesh between the teeth of the other roller.

The side walls 30 of the frame 1 are preferably curved on arcs substantially concentric with the axes of the shafts 16 and 17 respectively and the inner surfaces of such walls are furnished with series of vertical ribs 28 and 29 respectively defining grooves for the reception of the series of teeth upon the respective rollers.

The curved walls 30 of the frame preferably terminates substantially at the points 31 and the ribs 28 and 29 are continued down below such lower edges to form stripper teeth 32 and 33 respectively, the inner surfaces of which are closely adjacent to and substantially concentric with the outer surfaces of the respective rolls, the teeth terminating in sharp points.

The inner end of the shaft 23 is connected to the end of a spiral or helical feeding knife 34 whose opposite end is slidably journalled in the rear end wall of the frame. Preferably this knife is provided at suitable intervals with projecting spurs 35.

The upper edge of the frame 1 is furnished with upstanding, outwardly divergent ears 36 to which a hopper 37 preferably of sheet metal is secured by means of screws 38.

Figure 3:
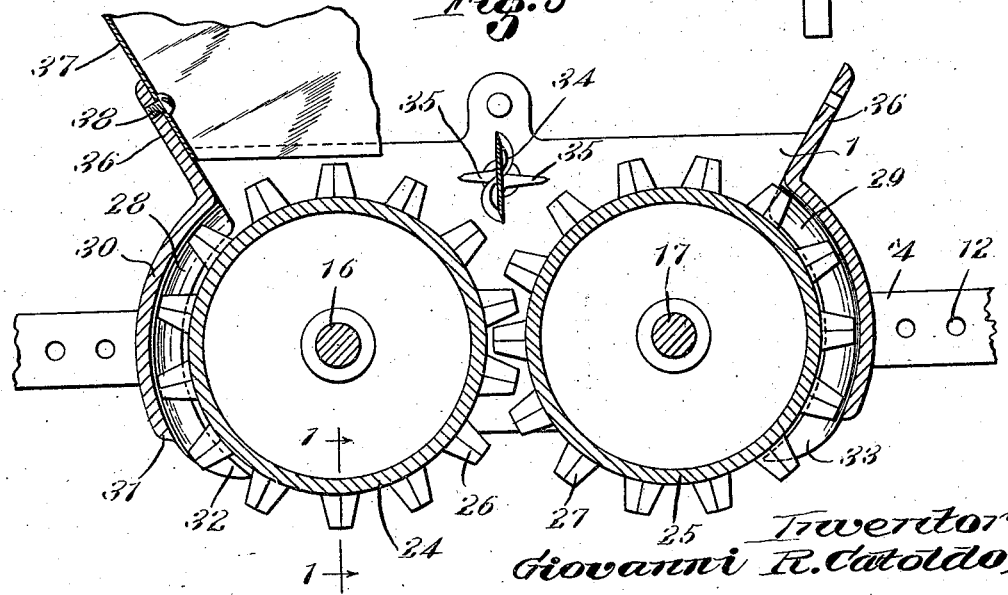
Fig. 3 is a fragmentary vertical section substantially on the line 3—3 of Fig. 1.

In operation the device is mounted upon a suitable receptacle as above described and the material to be crushed is thrown into the hopper. The crank 21 is then rotated causing the crushing rollers to rotate toward each other and at the same time rotating the spiral or helical knife 34 which as indicated in Fig. 3 is disposed immediately above the angle between the approaching faces of the rolls. This rotating knife, with its spurs 35, bites into the material piled into the hopper and forces the material between the oppositely rotating rolls. The material is thus positively presented to the crushing teeth of the rollers which grip it and effectively crush it so that it emerges from between the rolls in the form of a substantially homogeneous pulp. By reason of the fact that the teeth of the crushing rolls are substantially flat at their outer ends a true crushing action is obtained since the end of each tooth lies closely adjacent to the body of the opposite roll as the tooth passes down through the horizontal plane. As the pulp emerges below the bite of the rolls most of it is stripped off by the fingers or teeth 32 and 33 and any remaining material is removed by the edge 31 of the frame as the teeth pass up into the grooves between the ribs 28 and 29.

The device thus provided is simple, cheap to construct, relatively light in weight and easy to handle, and at the same time is extremely effective for the intended purpose.

I claim:

1. Apparatus of the class described comprising a substantially rectangular frame having vertical end walls, shafts journalled in said end walls, said shafts being provided with crushing rolls disposed inside of the frame, radially projecting teeth upon the peripheries of said rolls, said teeth being arranged in circumferentially extending axially spaced series, and ribs upon the inner surfaces of the side walls of the frame disposed between adjacent series of teeth upon the respective rolls.

2. Apparatus of the class described comprising a rectangular frame having vertical end walls provided with bearing openings, a pair of parallel shafts journalled in said openings each shaft carrying a crushing roll, the side wall of the frame being curved concentrically with the axes of said rolls, axially spaced series of teeth upon the cylindrical surface of each roll, said teeth projecting to a position closely adjacent to the inner surfaces of said curved side walls of the frame, and ribs projecting from the inner surfaces of said curved side walls defining grooves for the reception of the teeth of the respective rolls.

3. Apparatus of the class described comprising a frame opening at top and bottom having a pair of crushing rolls therein, said rolls being parallel and turning in opposite directions, the side walls of the frame being curved concentrically with the axes of the adjacent rolls, series of teeth projecting from the cylindrical surfaces of the rolls, and stripper members projecting down from the lower edges of the side walls of the frame and lying between axially spaced series teeth of the respective rolls such strippers being adapted to strip the crushed pulp from the outer surfaces of the rolls.

4. Apparatus of the class described comprising a frame having journal openings in its opposite ends for a pair of parallel shafts, a crushing roll mounted upon each shaft, each roll being provided with axially spaced circumferentially extending series of crushing teeth, the series of teeth upon one roll being disposed oppositely to the spaces between the series of teeth upon the other roll, and means for turning the rolls in opposite directions, the side walls of the frame being provided with channels shaped to receive the teeth of the several series of each roll as the rolls are rotated.

5. Apparatus of the class described comprising a pair of crushing rolls each having axially spaced series of crushing teeth, a frame supporting said rolls, said frame being provided with side walls curved concentrically with the surfaces of said rolls, the inner faces of said curved walls being provided with ribs projecting into the spaces between the series of teeth upon the respective rolls and providing channels within which such teeth move, said ribs extending beyond the lower edge of the frame and having pointed ends forming stripping teeth to remove the crushed pulp from the surfaces of the rolls.

Signed by me at Boston, Massachusetts, this 19th day of May, 1925.

GIOVANNI R. CATOLDO.